United States Patent [19]

Vidovic

[11] 3,809,809

[45] May 7, 1974

[54] TECHNIQUE FOR DETECTING LONG DURATION PULSES FROM A TRAIN OF SHORT DURATION PULSES

[75] Inventor: Nikola Vidovic, Sunnyvale, Calif.

[73] Assignee: International Video Corporation, Sunnyvale, Calif.

[22] Filed: Dec. 13, 1972

[21] Appl. No.: 314,734

[52] U.S. Cl. .......... 178/69.5 TV
[51] Int. Cl. .......... H04n 5/10
[58] Field of Search ..... 329/106; 307/234; 325/325; 178/88, 69.5 TV

[56] References Cited

UNITED STATES PATENTS 3,575,664 4/1971 Kamin .......... 307/234

*Primary Examiner*—Richard Murray
*Attorney, Agent, or Firm*—Limbach, Limbach & Sutton

[57] ABSTRACT

A circuit particularly adapted for detecting the occurrence of vertical sync pulses in a composite television synchronization pulse train. In a first subcircuit horizontal and equalizing pulses are inverted, while the subcircuit acts as a one-shot for the longer pulses in the vertical sync interval. The input and subcircuit output are summed so that cancellation is achieved until the one-shot action has concluded in the vertical sync interval. The remaining portion of the vertical sync interval thus is not cancelled and is used to generate an output pulse that indicates the occurrence of the vertical sync period.

8 Claims, 7 Drawing Figures

TECHNIQUE FOR DETECTING LONG DURATION PULSES FROM A TRAIN OF SHORT DURATION PULSES

BACKGROUND OF THE INVENTION

This invention relates generally to techniques and circuits for pulse detection and more specifically relates to a technique and circuit for detecting the occurrence of vertical synchronization pulses during the composite synchronization pulse train of a television signal.

The composite synchronization pulse train of a television signal includes a train of horizontal sync pulses, one pulse for each horizontal line. Periodically, pulses of different widths than the horizontal line pulses occur as vertical field interval or pulses. In television equipment such as a video tape recorder (VTR), it is essential to accurately recognize the occurrence of the vertical synchronization pulses despite adverse signal conditions such as noise and transients. For example, transients occur, during every vertical interval in VTR's that switch heads during the vertical interval. Transients also result from motor and relay switching in a VTR.

A principal technique presently being used for detecting the existence of field pulses from a train of horizontal line pulses is to integrate the incoming pulse train of the composite synchronizing signal. The voltage magnitude reached at the output of the integrator as a result of each pulse is directly proportional to the duration of that pulse. Some type of convenient threshold device is thus employed to indicate an incoming pulse has been received that has a duration in excess of a predetermined duration.

A primary problem with this technique is that field pulses are often falsely detected during a burst of noise that can drive an integrator output to a level above that of the threshold device and thus falsely tirgger it. Therefore, it is a primary object of the present invention to provide a technique and circuit for more reliably detecting the existence of a long duration pulse such as a field pulse from a train of short pulses such as horizontal line pulses.

SUMMARY OF THE INVENTION

This and additional objects are accomplished by the techniques of the present invention wherein the incoming train of both short and long duration pulses are applied to a subcircuit which inverts short duration pulses such as horizontal and equalizing pulses and which acts as a one-shot for the first portion of long duration pulses such as vertical sync pulses. No output is produced when pulses are closely spaced such as vertical sync pulses. The output of the subcircuit is summed with the input pulse train signal. This summation signal remains at a constant level (substantially zero — there is cancellation of the two signals) during the short input horizontal and equalizing pulses, but as soon as a pulse having a long duration is received, the summation signal abruptly changes and becomes the same as the input vertical sync interval signal since no output pulses are obtained from the subcircuit during the remainder of the vertical sync period. A single pulse is derived at this transition by means of further circuitry which first removes the serrations from the vertical sync interval and then triggers a one-shot. The serrations are removed to prevent multiple triggering of the one-shot. This subtractive technique has a primary advantage in that it is immune to many types of noise that can be received along with the desired pulse information from an input signal.

Thus, broadly defined, the overall circuit produces no output for pulses having a duration less than a predetermined length and spaced closer than a predetermined time. As one specific example, horizontal sync and equalizing sync pulses. The overall circuit produces a single pulse output in response to a pulse having a duration greater than the predetermined length or in response to a train of pulses having a length greater than the predetermined length and spaced closer than a predetermined time. As one specific example, a vertical sync pulse or the complete interval of vertical sync pulses.

The techniques of the present invention are useful generally for any application wherein the existence of a long duration pulse is desired to be detected from a train of normally short duration pulses. An application where the technique is especially valuable, however, is in detecting the existence of a field pulse from a composite television synchronizing signal. One specific use of a field detector according to the present invention is described in a copending application of Bert H. Dann and Nikola Vidovic entitled, "Synchronizing Pulse Processor for a Video Tape Recorder," Ser. No. 285,919, filed Sept. 1, 1972.

Additional objects and advantages of the pulse detecting technique according to the present invention will become apparent from the following description of a preferred embodiment which should be taken in conjunction with the accompanying drawings.

DESCRIPTION OF THE PREFERRED EMBODIMENTS

Figure 1:
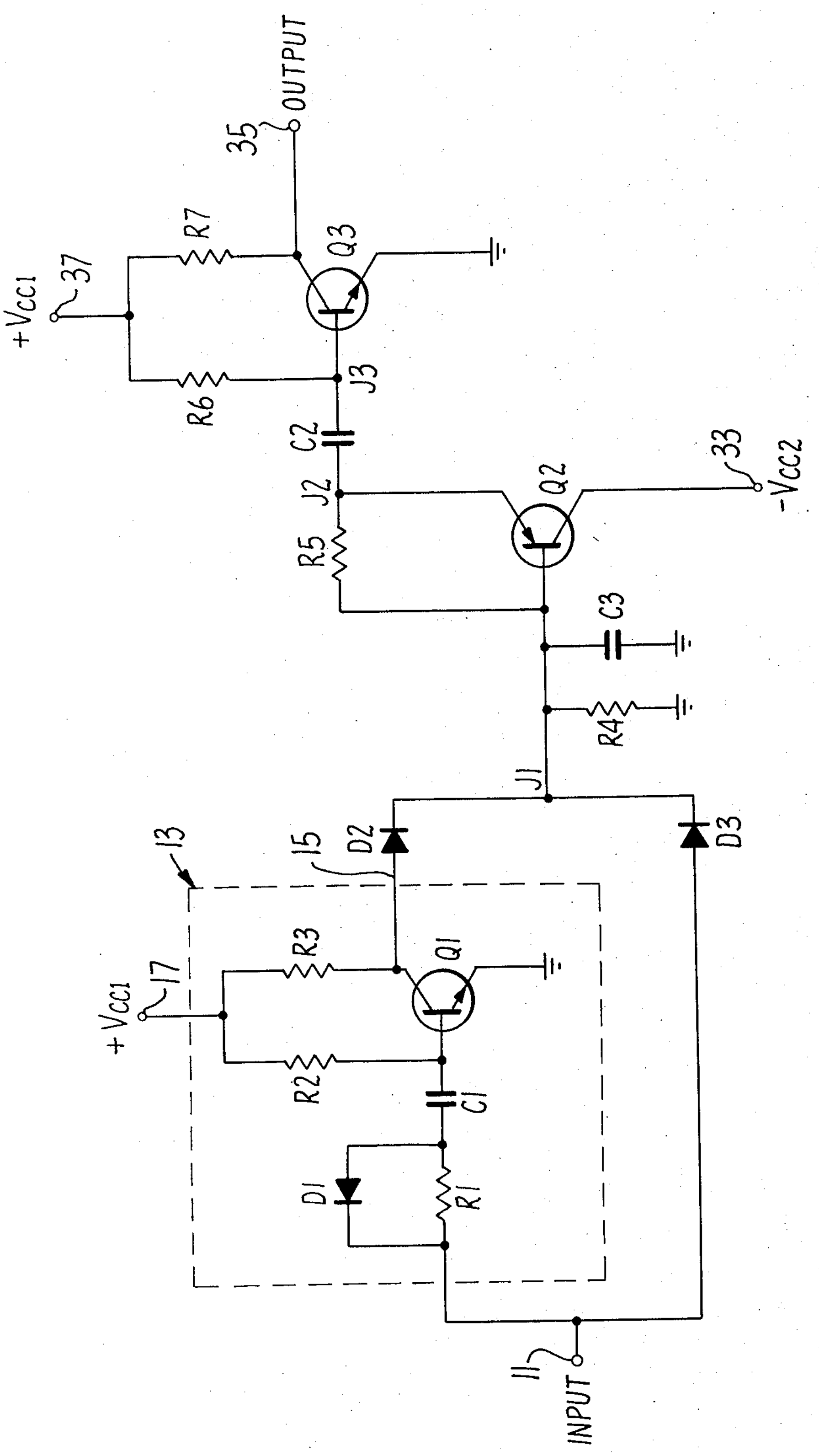
FIG. 1 is a schematic diagram of a preferred electronic circuit for carrying out the technique of the present invention; and FIGS. *2a* – *2f* show a plurality of sample waveforms at various points in the circuit of FIG. 1 which are useful in understanding the invention.

Referring to FIG. 1, an input terminal 11 receives an input signal in the form of a train of pulses and this input signal is directed in two paths. One path is to the input of a subcircuit 13 that functions either as an inverter or a one-shot for certain pulses and that provides no output for certain pulse sequences. An output line 15 of circuit 13 is connected to a junction J1 through a series diode D2. The other path in which the input signal is fed from the input terminal 11 is directly to the junction J1 through a series diode D3. Circuit 13 emits output pulses in the output line 15 which are inverted in polarity from the input pulses at the input terminal 11. Therefore, the signal at junction J1 is equal to the sum of the input signal at the terminal 11 and the output signal in line 15 from the circuit 13.

Circuit 13 includes an NPN transistor Q1 with its base connected to the input terminal 11 through a series circuit of the capacitor C1 and a resistor R1 with the resistor R1 being shunted by a diode D1. The emitter of transistor Q1 is grounded. A voltage supply $V_{cc1}$ terminal 17 is connected to the base of the transistor Q1 through a series resistor R2 and to the collector of the transistor Q1 through a resistor R3.

Figure 2:
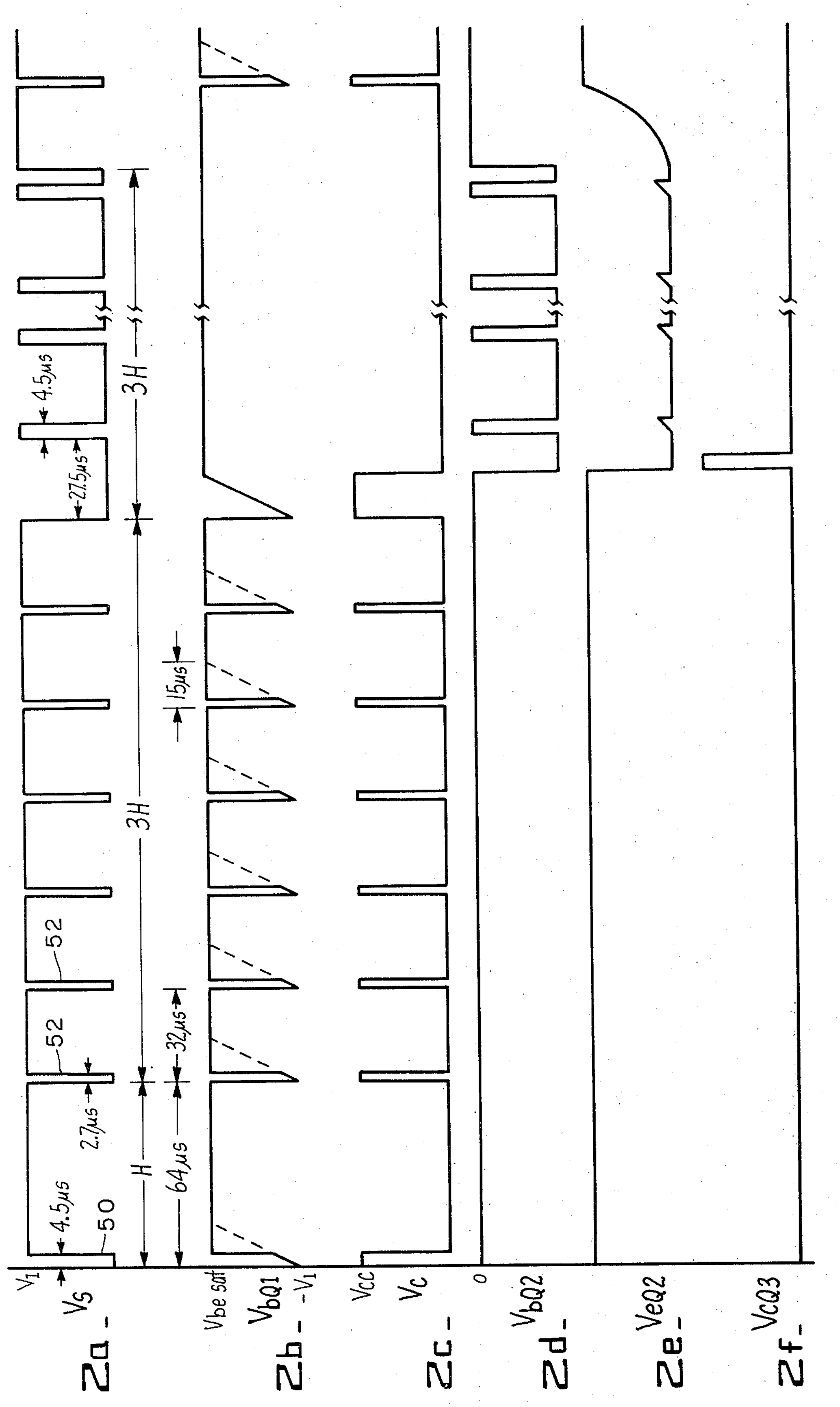

Referring to FIG. 2a, a portion of a standard composite synchronization pulse train for a 525 line, 60 Hz, television system is shown. This pulse train is applied as the source voltage, $V_s$, to the input terminal 11. It will be understood that the invention is equally usable with other line standards and moreover, that the teachings herein may be applied in systems and applications other than television. The composite sync comprises a horizontal pulse interval (H) having negative going pulses of about 4.5$\mu$ seconds width at a repetition rate of 64$\mu$ seconds. Only the last horizontal pulse 50 in the horizontal pulse interval is shown. As is well known, the horizontal interval is followed by an equalizing pulse interval of 3H width. The negative going equalizing pulses 52 of 2.7$\mu$ seconds width occur at 32$\mu$ seconds, twice the horizontal pulse rate. Next, the vertical sync pulse interval of 3H width occurs. The interval can be viewed as one wide negative going pulse with 4.5$\mu$ second serrations or alternately as a series of six negative going pulses of about 22$\mu$ seconds width separated by 4.5$\mu$ second spaces. Only two complete vertical pulses 54 are shown to conserve drawing space. At the end of the vertical sync pulse interval, the further equalizing pulse interval of 3H width occurs (shown in part), followed by the horizontal sync pulse interval (not shown).

In the absence of any input signal, Q1 would be held in saturation due to the connection of the base to the supply voltage $V_{cc1}$ through R2.

During the times between horizontal pulses 50 or equalizing pulse 52 the capacitor C1 charges to the input voltage $V_1$ through resistor R1. The positive value of $V_s$ is chosen so that an equal and opposite negative value is sufficient to cut off Q1. The transistor Q1 base of C1 is at the transistor base saturation voltage, $V_{sat}$, of typically less than one volt. Since R1 is a high value, 100 KΩ, for example, C1 charges relatively showly. R1 is chosen so that during serrations in the vertical interval C1 will not charge to a voltage sufficient to turn on D1. Between horizontal pulses or equalizing pulses C1 charges to the full positive supply voltage. When a horizontal pulse or equalizing pulse occurs, the voltage at the base of Q1, $V_{bQ1}$, immediately goes negative to a voltage substantially equally to $-V_1$. This is because C1 is charged to $V_1$ (less the small Q1 base saturation voltage), D1 conducts as $V_s$ goes negative thus clamping the input side of C1 to ground (the impedance of the source is very low). Since the voltage on the capacitor cannot change instantaneously the Q1 side of C1 must go to $-V_1$ thus cutting off Q1. When Q1 is cut off, its collector voltage $V_c$ is, or course, substantially at the supply voltage $V_{cc1}$.

While Q1 is cut off the Q1 base voltage $V_{bQ1}$ rises asymptotically toward $V_{cc1}$, but would never reach $V_{cc1}$ because Q1 would saturate, thus only reaching $V_{be\ sat}$. The time to reach $V_{be\ sat}$ is determined by C1 and R2 and is about 15$\mu$ seconds if R2 is 33 KΩ and C1 is 820 pf. Ordinarily, for horizontal and equalizing pulses, Q1 does not return to saturation because $V_s$ returns to $V_1$ in less than 15$\mu$ seconds.

However, when the first vertical sync pulse occurs, which is 27.5$\mu$ seconds long, the charging of C1 through R2 does occur within the pulse period, hence at the end of 15$\mu$ seconds Q1 goes into saturation. At the end of the first vertical sync pulse $V_s$ returns to $V_1$, however only for 4.5$\mu$ seconds. This time is not long enough to build up a significant charge on C1, hence when $V_s$ goes negative again for the next vertical sync pulse there is not enough voltage on the input side of C1 to forward bias D1 and cause it to conduct, hence Q1 is not cut off and remains saturated. Q1 continues in saturation until the end of the vertical sync period when $V_s$ returns to $V_1$ for 22$\mu$ seconds, long enough for C1 to charge fully through R2, thus cutting off Q1 when the first succeeding equalizing pulse 52 occurs according to the action described above.

Thus, provided that C1 has time to recharge to $V_s$ (the input must remain positive longer than the R1–C1 1n2 time constant), Q1 acts as an inverter for negative going pulses shorter than the R2–C1 1n2 time constant and Q1 acts as a one shot for pulses longer than the R2–C1 1n2 time constant. In the case of the vertical sync pulses 54, Q1 acts as a one shot only once due to the short positive excursions of $V_s$ at the vertical sync pulse serrations. Thus C1 does not acquire a sufficient charge to forward bias D1 and cut off Q1.

Referring to FIGS. 2b and 2c it is seen that the Q1 base voltage $V_{bQ1}$ immediately drops to $-V_1$ at each pulse 50 and 52 because C1 had sufficient time to charge between pulses 50 and 52.

The Q1 collector pulses $V_c$ (FIG. 2c) on line 15 are summed with the input pulses $V_s$ (FIG. 2a) at J1. Thus, the horizontal pulses 50 and equalizing pulses 52 cancel each other and provide a zero output to the base of Q2 (FIG. 2d). However, once 15$\mu$ seconds of the first vertical sync pulse passes there is no equal and opposite cancelling signal on line 15 and the input signal is applied directly to the base of Q2.

It is desired to generate a single pulse in place of the remaining portion of the vertical sync interval that is present at the base of Q2. Therefore, the signal at the junction J1 is further processed. This signal is applied to a base terminal of a PNP transistor Q2 which has a collector connected to a negative voltage supply $V_{cc2}$ terminal 33. The base of the transistor Q2 is also connected to the junction between resistors R4 and R5 which extend between its emitter and ground. The transistor Q2 operates as an emitter follower for a zero volt signal level at its base input but is turned off by a voltage level in excess of zero volts. The stage including the transistor Q2 eliminates the serrations of the waveform of FIG. 2c to generate a single negative going pulse of very long duration as shown in FIG. 2e at its emitter which is connected to a junction J2. The time constant of the resistor R5 and a capacitor C2 which is connected to the junction J2 determines the effect of the serrations of the waveform of FIG. 2d on the waveform of FIG. 2e. A capacitor C3 may be added between the base of Q2 and ground to cancel spikes caused by differential delay in the two signal paths to J1.

The other side of the capacitor C2 is connected to a junction J3 which is also connected to a base of a NPN transistor Q3 connected to operate as a one-shot multivibrator. It is important that Q2 has removed the serrations, otherwise Q3 would fire at each vertical sync pulse. The emitter of the transistor Q3 is connected to ground while its collector is connected to an output terminal 35 and also to a positive voltage supply $V_{cc1}$ terminal 37 through a resistor R7. The base of the transistor Q3 is also connected to the positive voltage supply terminal 37 through a resistor R6. The transistor Q3 is normally off but presents an output pulse at the terminal 35 as shown in FIG. 2f at the beginning of the very long pulse of FIG. 24 which appears at the junction J2. The duration of the output pulse of FIG. 2f is determimed by the time constant of the capacitor C2 and the resistor R6. The purpose of the stage including the transistor Q3 is to emit a short duration positive pulse of the type shown in FIG. 2f in place of the longer duration irregular pulse of FIG. 2e. The entire circuit produces a single pulse as shown in FIG. 2f a predetermined time after the first vertical sync pulse leading edge. The delay is determined by the R2–C1 1n2 time constant, 15μ seconds in this example. If desired the R2–C1 1n2 time constant can be varied, for example, to be made longer so as to provide an output pulse at terminal 35 during the second broad vertical pulse.

Thus the circuit according to the present invention provides no output pulse at terminal 35 for the case where the input at terminal 11 consists of pulses less than a predetermined length, determined by the R2–C1 1n2 time constant, and spaced apart greater than a predetermined time, determined by the R1–C1 1n2 time constant. Whereas the circuit according to the present invention provides a single pulse for the case where in terminal 11 input is a pulse preceded by a time greater than a predetermined amount, determined by the R1–C1 1n2 time constant and having a duration greater than a predetermined length determined by the R2–C1 1n2 time constant. Alternately, a single pulse is provided when that last mentioned long duration pulse is followed by one or more pulses of such length that are spaced less than a predetermined time determined by the R1–C1 1n2 time constant.

The present circuit avoids the problems of integration type techniques in which a false pulse can be produced as a result of noise. According to the present invention noise pulses would be cancelled at junction J1 thus having no affect on the output. It will also be realized tha the choice of the R2–C1 1n2 time constant will affect the fail safe quality of the output pulse. As the time constant extends further into the vertical sync period the already small chances of false indications are reduced even further.

In one working embodiment of the embodiment of the invention shown in FIG. 1, the following circuit values were employed.

| | |
|---|---|
| R1 | 100 KΩ |
| R2 | 33 K Ω |
| R3 | 1 K Ω |
| R4 | 10 K Ω |
| R5 | 220 K Ω |
| R6 | 5.6 K Ω |
| R7 | 1 K Ω |
| C1 | 820 pf |
| C2 | 2200 pf |
| C3 | 50 pf |
| $V_{cc1}$ | +5 volts |
| $-V_{cc2}$ | −12 volts |

The present invention has been described by way of a specific circuit example, but it will be understood that the invention is to be protected within the full scope of the appended claims.

I claim:

1. Apparatus for detecting a broad pulse in a train of narrow and broad input pulses comprising means for generating a pulse of substantially the same width as said input pulses in response to an input pulse having less than said predetermined duration and spaced a time greater than said predetermined time from the preceding pulse and for generating a pulse of a width of said predetermined duration in response to a pulse having a width greater than said predetermined duration and spaced a time greater than said predetermined time from the preceding pulse and in response to a train of pulses having a width greater than said predetermined duration, the first of said train of pulses spaced a time greater than said predetermined time from the preceding pulse and said train of pulses internally spaced a time less than said predetermined time.

2. Apparatus according to claim 1 wherein said apparatus further comprises means for subtracting the pulse output of said generating means from said input pulses whereby said input pulses are cancelled for pulses having less than said predetermined duration and spaced a time greater than said predetermined time from the preceding pulse and whereby the final portion of a pulse having a width greater than said predetermined duration or the final portion of a train of pulses having a width greater than said predetermined duration and spaced a time less than said predetermined time is provided as an output from said subtracting means.

3. Apparatus according to claim 2 wherein said apparatus further comprises means receiving the output of said subtracting means for generating a signal continuously during a pulse and during a train of pulses spaced a time less than said predetermined time.

4. Apparatus according to claim 3 wherein said apparatus further comprises means receiving the output of said last recited means for generating a pulse of a second predetermined length in response to said signal generated continuously.

5. Apparatus according to claim 4 wherein said train of narrow and broad pulses is a composite synchronization television pulse train and said pulses less than a predetermined duration and spaced a time greater than a predetermined time from the preceding pulse are horizontal synchronization pulses and equalizing synchronization pulses and said pulses greater than a predetermined duration and internally spaced a time less than said predetermined time are vertical synchronization pulses.

6. Circuit apparatus receiving a train of narrow and broad input pulses comprising means for generating a pulse of substantially the same width as said input pulses in response to an input pulse having less than a predetermined duration and spaced a time greater than a predetermined time from the preceding pulse and for generating a pulse of a width of said predetermined duration in response to a pulse having a width greater than said predetermined duration and spaced a time greater than said predetermined time from the preceding pulse and in response to a train of pulses having a width greater than said predetermined duration, the first of said train of pulses spaced a time greater than said predetermined time from the preceding pulse and said train of pulses internally spaced a time less than said predetermined time.

7. Apparatus according to claim 6 wherein said means comprises an NPN transistor having an emitter, base and collector with its emitter grounded, a voltage terminal connectable to a positive voltage source, an input terminal connectable to a low impedance signal source, series first resistance and capacitance means connected between said input terminal and the base of said transistor, diode means connected in parallel to said resistance means polarized to primarily pass current toward said input terminal, second resistance means connected between said voltage terminal and the base of said transistor, third resistance means connected between said voltage terminal and the collector of said transistor, and means for providing an output at the collector of said transistor.

8. A method of detecting a broad pulse in a train of narrow and broad pulses comprising generating a pulse of substantially the same width as said input pulses in response to an input pulse having less than said predetermined duration and spaced a time greater than said predetermined time from the preceding pulse and for generating a pulse of a width of said predetermined duration in response to a pulse having a width greater than said predetermined duration and spaced a time greater than said predetermined time from the preceding pulse and in response to a train of pulses having a width greater than said predetermined duration, the first of said train of pulses spaced a time greater than said predetermined time from the preceding pulse and said train of pulses internally spaced a time less than said predetermined time, and subtracting the pulse output of said first means from said input pulses whereby said input pulses are cancelled for pulses having less than said predetermined duration and spaced a time greater than said predetermined time from the preceding pulse and whereby the final portion of a pulse having a width greater than said predetermined duration or the final portion of a train of pulses having a width greater than said predetermined duration and spaced a time less than said predetermined time is provided as an output from said sustracting means.

* * * * *